(No Model.)

L. J. MACY.
AERATOR.

No. 447,573. Patented Mar. 3, 1891.

Witnesses
Villette Anderson,
Philip C. Masi.

Inventor
Lewis J. Macy
by E. W. Anderson
his Attorney

UNITED STATES PATENT OFFICE.

LEWIS J. MACY, OF PULASKI, NEW YORK.

AERATOR.

SPECIFICATION forming part of Letters Patent No. 447,573, dated March 3, 1891.

Application filed August 25, 1890. Serial No. 362,946. (No model.)

*To all whom it may concern:*

Be it known that I, LEWIS J. MACY, a citizen of the United States, and a resident of Pulaski, in the county of Oswego and State of New York, have invented certain new and useful Improvements in Aerators for Cooling and Removing Animal Heat from Milk; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
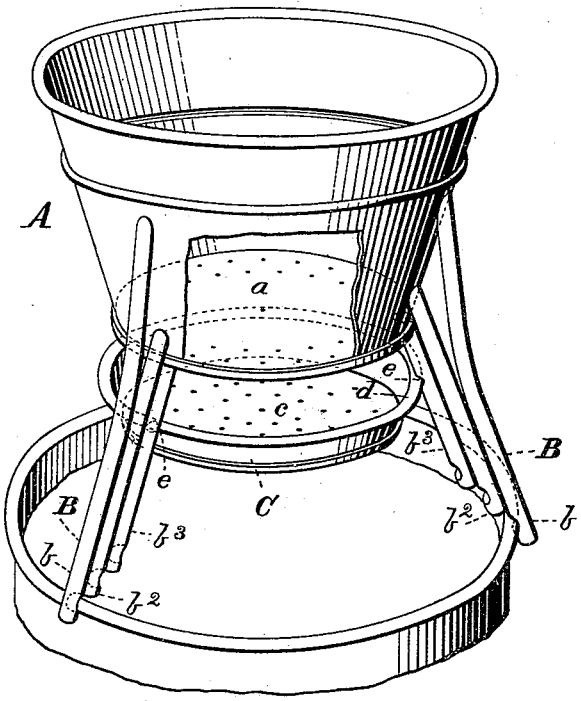
Figure 2:
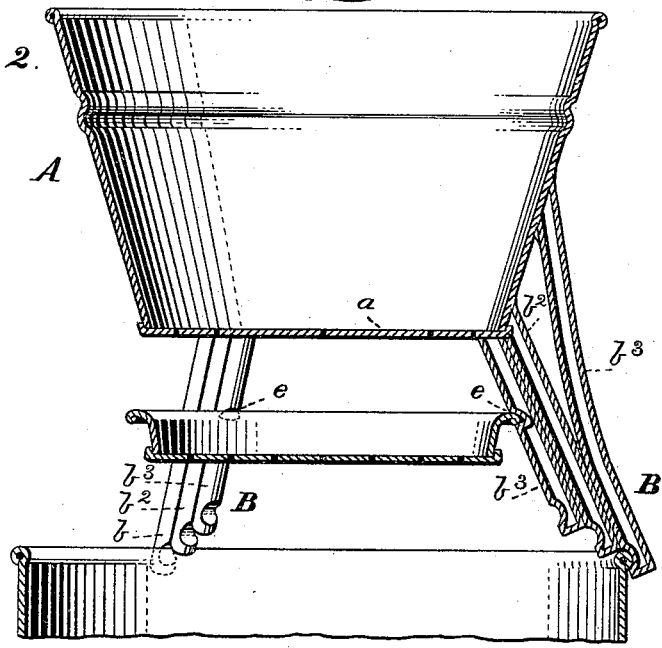

Figure 1 of the drawings is a representation of this invention and is a perspective view. Fig. 2 is a vertical section.

My invention relates to aerators for cooling and removing animal heat from milk, and especially to those designed for use in connection with and attached to milk-cans; and it consists in the construction and combination of parts hereinafter disclosed.

In the accompanying drawings, A represents a receptacle for receiving the milk, preferably of flaring or cup-shaped form, and provided with a perforated or foraminated bottom $a$, allowing the passage of the milk therethrough in small separate streams.

Soldered or secured to the outside of the receptacle A at equidistant points are the legs or support B B B, each consisting of the three parts $b$ $b^2$ $b^3$, preferably formed of cylindrical tubing. The outer piece $b$ is secured to the outer surface of the receptacle about midway of its depth, while the inner pieces $b^2$ $b^3$ are preferably secured near the bottom portion, the three pieces being soldered together or connected at their lower ends, each piece terminating at its lower end at a point inside of and above that of the next outer piece, their ends forming a series of steps. Near each lower end of these pieces is formed a small notch or seat adapted to engage the rim of the neck-piece of a milk-can, and thus support the receptacle thereon, the notches in the three outer pieces $b$ being adapted, as seen, to engage a can of larger diameter, while the notches in the pieces $b^2$ $b^3$ are respectively to engage cans of smaller diameter.

A short distance beneath the perforated bottom $a$ of the receptacle A is provided a shallow pan or receptacle C, formed with a perforated bottom $c$, the object of this pan or receptacle being to catch the small streams of milk escaping through the perforated bottom above and allow them to escape again in other small streams through its own perforated bottom, thus bringing the milk more in contact with the air and obviating the liability of the streams being blown over the side of the can by the wind. This pan or receptacle C is supported in position by means of the upper turned or flanged edge $d$ of its side wall engaging small supporting-notches $e$, which are correspondingly formed in each of the inside pieces $b^3$ of the legs or supports. It will be seen by this construction that the milk will be brought freely in contact with the air in its passage from the receptacle to the can, and, further, that the double set of perforated disks through which it passes serve as a strainer to remove dirt and other foreign substances.

Having thus described this invention, what I claim, and desire to secure by Letters Patent, is—

1. A cooler and aerator for milk-cans, consisting, essentially, of a receptacle provided with a perforated bottom and having secured to its outer surface a series or set of legs or supports, their lower ends provided with a series of notches or seats adapted to engage and be supported upon milk-cans of different diameters or sizes, substantially as described.

2. A cooler and aerator for milk-cans, consisting, essentially, of a receptacle provided with a perforated bottom and having secured to its outer surface a series or set of legs or supports, their lower ends provided with a series of notches or seats adapted to engage milk-cans of different sizes, and a second dish or receptacle having a perforated bottom placed beneath the first receptacle and held in position by supporting-notches formed in said legs or supports, substantially as described.

3. The cooler and aerator for milk-cans, having the receptacle provided with a perforated bottom, the legs or supports secured to said receptacle, said legs being formed of parts having different lengths, each series of corresponding parts being adapted to engage milk-cans of different diameters, and a second receptacle or pan provided with a perforated bottom placed beneath the first receptacle and engaging supporting-notches in the said legs, substantially as described.

In testimony whereof I affix my signature in presence of two witnesses.

LEWIS J. MACY.

Witnesses:
A. S. KLOCK,
F. D. JOHNSON.